Feb. 20, 1934.     J. C. HANDY     1,948,034
APPARATUS FOR DELIVERING A LUBRICANT OR OTHER LIQUID TO A FLUID STREAM
Filed March 25, 1929     2 Sheets-Sheet 1

Inventor
John C. Handy
By Lyon & Lyon
Attorneys

Feb. 20, 1934.    J. C. HANDY    1,948,034
APPARATUS FOR DELIVERING A LUBRICANT OR OTHER LIQUID TO A FLUID STREAM
Filed March 25, 1929    2 Sheets-Sheet 2
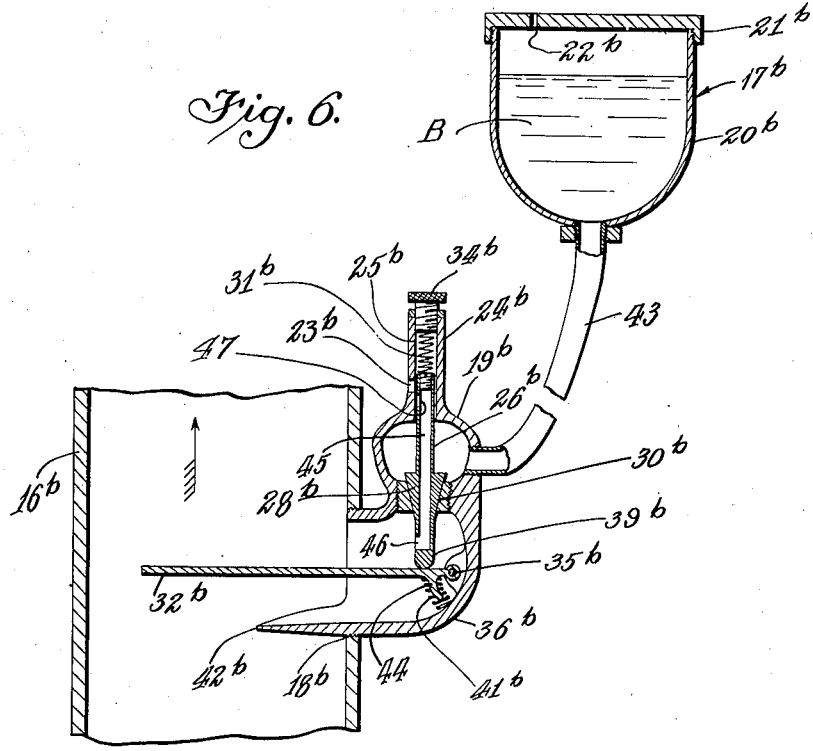
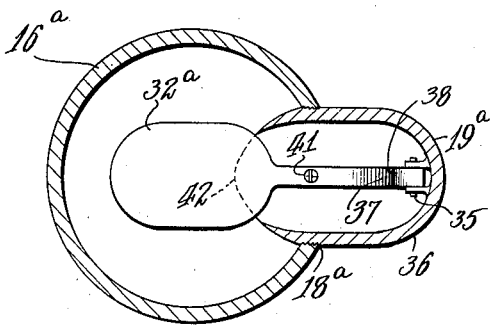
Inventor
John C. Handy
By Lyon & Lyon
Attorneys Patented Feb. 20, 1934

1,948,034

UNITED STATES PATENT OFFICE 1,948,034

APPARATUS FOR DELIVERING A LUBRICANT OR OTHER LIQUID TO A FLUID STREAM

John C. Handy, Berkeley, Calif., assignor to Standard Oil Company of California, San Francisco, Calif., a corporation of Delaware Application March 25, 1929. Serial No. 349,680

6 Claims. (Cl. 123—196)

This invention relates to apparatus for delivering a lubricant or other liquid to a fluid stream and it is useful, for example, for supplying a lubricant through the intake manifold to the cylinders and valves of an internal combustion motor.

The invention also relates to the method of delivering a lubricant or other liquid to a fluid stream.

More particularly, the invention is useful in the lubrication of certain parts of an internal combustion engine by supplying the lubricant to the cylinders with the fuel.

The invention also relates to methods and devices for reducing the tendency for the fuel to detonate. The term detonate, as employed in the art relating to internal combustion engines, defines a type of combustion in which the flame propagation is extremely rapid as compared to an explosion where the flame propagation is slower, and said term and allied terms are employed in the former sense in this specification.

The difficulties of properly lubricating the upper portions of the cylinders of an internal combustion motor, the valves, valve-stems and valve-guides of such motor by the usually employed methods have been long known and various other methods have been suggested and tried. By one of these methods the lubricant is mixed with the fuel so that the said lubricant is vaporized with the fuel as said fuel passes through the carburetor, and the finely divided lubricant is then carried along with the vaporized fuel to the points requiring lubrication. By another method a suitable lubricant is supplied from an auxiliary oil reservoir to the intake manifold between the carburetor and the intake ports, the partial vacuum created in the intake manifold being relied upon to feed the lubricant to the motor cylinders.

None of the methods of introducing a lubricant with the fuel has been entirely satisfactory. When lubricating oil is mixed with a liquid fuel it increases the viscosity of the mixture and this interferes with efficient handling in the fuel lines and in the carburetor and, furthermore, the carburation of the mixture results in breaking up of the oil into extremely fine particles or substantial vaporization of said oil, resulting in the oil tending to remain in suspension and to burn with the fuel, without any substantial deposition on the parts that it is aimed to lubricate in this manner.

In the method of introducing the lubricant to the vaporized fuel stream between the carburetor and the motor cylinders, in the practice of which method the auxiliary oiler is connected with the intake manifold, the difficulties described above are in some degree overcome, for the lubricant drawn into the intake manifold is broken up or atomized into comparatively large particles which tend to cling to the parts with which they come in contact. However, it will be clear to those versed in this art that the rate of delivery of the lubricant by the methods mentioned above is dependent on the partial vacuum created in the intake manifold, which partial vacuum, as is well known, varies inversely with the speed of the motor and, consequently, with the lubricant requirements of said motor. Thus, when the motor is running slowly the degree of partial vacuum is relatively high and, accordingly, large quantities of lubricant are drawn into the intake manifold and, vice versa, when the engine is operating on a wide open throttle the degree of partial vacuum produced is negligible and, accordingly, the delivery rate of the lubricant is materially reduced. It follows that a lubricant supply dependent upon the partial vacuum in the intake manifold is necessarily excessive at relatively low speeds and insufficient for proper lubrication at high speeds.

An object of the invention is to supply a lubricant for the valve assemblies and upper cylinder surfaces of internal combustion engines in accordance with operating requirements.

Another object is to provide for introduction of the lubricant to the carbureted fuel stream, as required.

Another object is the reduction of detonation.

Further objects and advantages will appear in the subjoined detailed description.

The invention, in some of its broader aspects, includes the introducing of a suitable lubricant to the carbureted fuel stream and the regulating of the rate of introduction in accordance with the operating requirements of the motor. It involves the use of a container for the lubricant in communication with the intake manifold of an internal combustion engine, together with a valve means in the line of communication responsive to the rate of fuel supply with which it varies directly.

While the invention is described in detail as applied to the lubrication of internal combustion engine parts by way of the intake manifold, it may be used to supply lubrication at other points, or it may be employed in connection with steam engines where the actuating means is placed in the steam line and the steam pressure acting on the oil reservoir is properly equalized. It may be used for delivering fluids other than lubricants, as for instance to introduce anti-knock materials such as ethyl fluid into a fuel for use in internal combustion engines. In general the invention comprehends all methods and apparatus within the scope of the claims whereby a fluid is delivered at a controlled rate dependent on the speed of a fluid in a flow stream.

The accompanying drawings illustrate the invention.

Figure 5 is a horizontal section on the line indicated by 5—5, Figure 4.

Figure 6 is a vertical section similar to Figure 4, illustrating a second modification of the invention.

Figure 1:
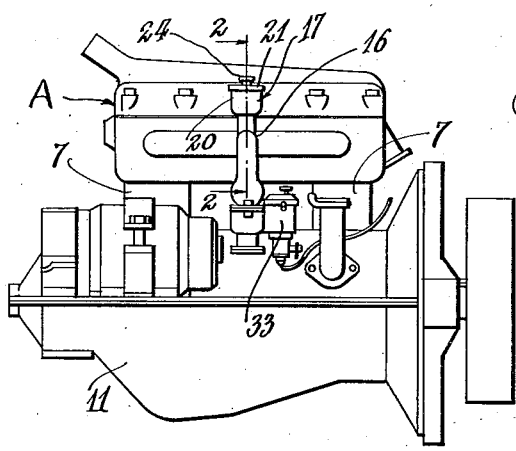
Figure 1 is an elevation, looking at the intake side, of an internal combustion engine in which the invention is embodied.
Figure 3:
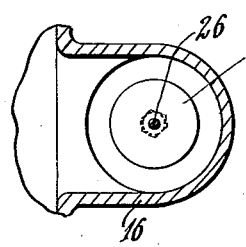
Figure 3 is a horizontal section on the line indicated by 3—3, Figure 2.
Figure 2:
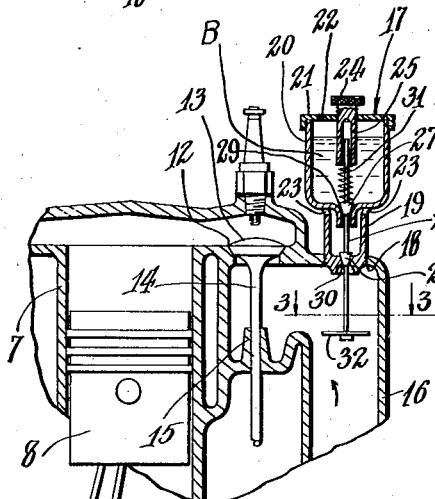
Figure 2 is an enlarged fragmentary vertical view, mainly in section, from the line indicated by 2—2, Figure 1.

First describing the form of the invention illustrated in Figures 1, 2 and 3, the engine in its entirety is indicated at A and it is provided with any desired number of cylinders 7. In each cylinder works a piston 8 which drives a connecting rod 9 that in turn rotates the crank shaft 10 carried by the crank case 11. Each of the cylinders 7 is provided with the customary intake port 12 controlled by a valve 13. The intake valves are automatically controlled, in a manner well understood in this art, so as to cause induction of the combustible mixture into the different cylinders at predetermined intervals in the cycle of the engine. Movement is transmitted to the valves 13 through their stems 14 working in valve guides 15.

Leading to the intake ports 12 is an intake manifold 16 and communicating at its lower end with the top of the manifold 16 is an oil feed device which is indicated in general by the character 17 and which, in this instance, is constructed as follows: The upper side of the manifold 16 is provided with a threaded hole 18 into which is screwed the lower end of a relief chamber 19 which, in this instance, is constructed integral with a lubricant container 20 provided with a removable cover 21 in which is a vent 22, the purpose of which is to avoid the formation of a partial vacuum in the container 20 so that the lubricant B in said container will discharge under its gravity head. The relief chamber 19 is also provided with a vent or vents 23. The purpose of the vents 23 is to prevent the influence of suction on the rate of lubricant delivery from the chamber 19 to the manifold.

Screwed into the cover 21 and projecting downwardly therefrom is a stem guide and spring seat 24 provided with a bore 25 into which projects the upper end of a valve stem 26. On the stem 26 are upper and lower valve plugs 27, 28 which control, respectively, upper and lower ports 29, 30, the upper port 29 opening from the container 20 into the chamber 19, and the lower port 30 opening from the chamber 19 into the manifold 16. Surrounding the upper portion of the valve stem 26 between the guide 24 an upper valve plug 27 is a coil spring 31 which yieldingly urges the valve plugs toward their closed positions. Tension of the spring 31 is adjusted by turning the valve guide 24 in the appropriate direction. The lower end of the valve stem 26 is provided with a draft actuated member or vane 32 which, in this instance, is in the form of a flat plate.

The carburetor for supplying the combustible mixture to the manifold 16 is indicated at 33 and, assuming that the engine A is in operation, the invention functions as follows: The velocity of the vaporized fuel in the manifold 16 causes a proportional raising of the member or vane 32, thus to open the valve plugs 27, 28 more or less and thus permit lubricant to flow under its gravity head from the container 20 into the chamber 19 and to flow from the chamber 19 into the manifold 16. The lubricant, to a large extent, will drop upon the upper face of the member 32 and be wiped therefrom by contact of the combustible mixture with said lubricant, thus carrying the lubricant in relatively large particles into contact with the valve stems 14 and with the upper portions of the cylinder walls so as to efficiently lubricate these parts. It will be noted that, since the degree of opening of the valve plugs 27, 28 is directly proportional to the velocity of the vaporized fuel or combustible mixture in the manifold 16, the lubricant will be supplied in accordance with the requirements of those parts of the engine that it is the aim of this device to lubricate.

Figure 4:
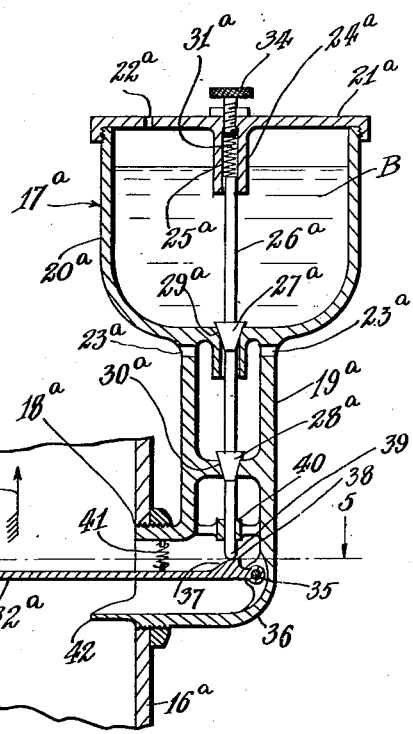
Figure 4 is an enlarged vertical section illustrating a modified form of the invention.

Now referring, more particularly, to Figures 4 and 5 of the drawing, illustrating a modification of the invention, the parts that functionally correspond with those described above are indicated by the same reference characters with the addition of the exponent "a". In this form of the invention the valve stem guide 24ª is not adjustable but is integral with the cover 21ª and a spring 31ª that yieldingly urges the valve plugs 27ª, 28ª toward their closed positions is, in this instance, positioned between the upper end of the valve stem 26ª and the inner end of a screw 34 which can be adjusted to change the tension of the spring, thus performing one of the functions of the spring guide 24 hereinbefore described.

In this instance, the means for actuating the valve stem 26ª against the pressure of the spring 31ª is differently constructed than described in connection with Figures 1 and 2, since the member or vane 32ª, which is also in the form of a plate, is pivotally connected at 35 to an elbow 36 that connects the chamber 19ª to the manifold 16ª. The elbow 36 enables the oil feed device 17ª to be connected with the upright wall of the manifold 16ª, and the member 32ª projects into the manifold 16ª at right angles to the direction of flow of the combustible mixture past said elbow. The upper face of the member 32ª is provided in alignment with the valve stem 26ª with a boss 37 which, in this instance, constitutes a cam since the upper face 38 of said boss is curved to form a cam face. The lower end 39 of the valve stem 26ª constitutes a follower that is in contact with the cam face 38. Just above the follower 39 the valve stem works through a guide 40.

When there is no flow of combustible mixture through the manifold 16ª, the cam face 38 is maintained in contact with the follower 39 by a coil spring 41 which is connected at one end to the upper face of the member 32ª and at its upper end to the inner face of the elbow 36 above the member 32ª.

Preferably the elbow 36 terminates within the manifold 16ª in an inwardly projecting lip 42.

The operation of the form of the invention illustrated in Figures 4 and 5 is quite similar to that described above for the embodiment illustrated in Figures 1 and 2. However, in this instance, the lubricant that discharges through the port 30ª drops into the fuel stream in the manifold 16ª from the inner end of the lip 42 so as to be broken up into smaller particles that are carried along with the vaporized fuel in the direction of the arrow a in Figure 4.

Both of the forms of the invention described above are mounted on the intake manifold, thus placing the lubricant containers in close proximity to the engine. It may be advisable, in some instances, to have the lubricant container at a remote point from the intake manifold and, accordingly, I have illustrated a construction of this character in Figure 6 wherein the parts that functionally correspond with those described above in connection with Figures 4 and 5 are indicated by the same reference numerals with the addition of the exponenet "b". In this instance, the lubricant container 17ᵇ is connected to the chamber 19ᵇ by an oil line 43. In this instance, there is no valve to control the flow of lubricant into the chamber 19ᵇ and, accordingly, there is just the one valve plug 28ᵇ for controlling the feed of lubricant to the intake manifold and this valve is located between the chamber 19ᵇ and the elbow 36ᵇ.

The spring 41ᵇ, in this instance, for holding the vane 32ᵇ in engagement with the lower end of the valve stem, when there is no flow of combustible mixture through the manifold, is a compression spring that surrounds a stud 44 projecting from the under side of the vane. The spring 41ᵇ is compressed between the vane and the inner face of the lower portion of the elbow 36ᵇ.

Instead of the chamber 19ᵇ being vented as described above in connection with Figures 1 to 3, the tubular valve stem guide 24ᵇ projects upwardly from the chamber 19ᵇ and is provided with a vent 23ᵇ, and the valve stem 26ᵇ is provided with a bore 45 and opening laterally from said bore is a port 46 open to the suction of the manifold 16ᵇ and a port 47, in the stem 26ᵇ, closed by contact with the guide 24ᵇ when the device is inactive. When the vane 32ᵇ is raised by the flow in the manifold 16ᵇ it lifts the valve stem 26ᵇ, bringing the port 47 into communication with the port 23ᵇ, thus permitting air to flow through the ports 47 and 23ᵇ, the bore 45 and the port 46 so as to avoid the influence of suction on the rate of lubricant supplied as said lubricant escapes past the valve plug 28ᵇ through the port 30ᵇ.

The embodiments of the invention described above are simple and it is not believed necessary to describe in detail numerous other variations that may be employed. While a vane positioned in the fuel or combustible mixture stream, actuated by the velocity of said stream, has been described as the actuating means for the valve that controls the flow of lubricant to the intake manifold, it is to be understood that the invention in its broader phases is of a scope to include any other suitable actuating means for said valve provided said actuating means opens the valve to a degree that varies directly as the speed of the engine.

It has been ascertained by experiment that apparatus constructed and used in accordance with the principles on which this invention is based supply lubricant in a condition and quantity to efficiently lubricate the upper cylinder walls, the piston surfaces, the valves, valve stems and the valve stem guides and that a further result is the reduction in the detonating effect referred to. I apprehend that the superior lubrication achieved by this method and apparatus is due to the controlled application, not only, but to the fact that the apparatus causes the body of lubricant to be broken up into comparatively large globules by the high velocity of the vapor stream into which the oil is introduced. I apprehend, also, that these comparatively large globules of oil, thus entrained with the fuel, retard or dampen the flame propagation in the fuel so as to materially reduce the tendency toward the detonating effect of the ignited fuel.

I claim:

1. An apparatus of the character described comprising a carubreted-air line, a container, a chamber communicating with the container and vented to the atmosphere, a valve means between the chamber and the carbureted-air line, and means responsive to the velocity of the carbureted-air in said line to vent said chamber and deliver a fluid therefrom to the carbureted-air line.

2. An apparatus of the character described comprising a container vented to the atmosphere, a chamber connected with said container and vented to the atmosphere, an outlet port for said chamber, a valve to control said outlet port, and a means operable by a fluid stream for operating said valve.

3. An apparatus of the character described comprising a container vented to the atmosphere, a chamber communicating with said container and vented to the atmosphere, a valve to control the communication between the chamber and the container, the chamber provided with an outlet, a valve to control said outlet, and a means responsive to a fluid stream to operate the said valves.

4. An apparatus of the character described comprising a chamber vented to the atmosphere and provided with an outlet port, a valve to control said port, and a vane engageable with the stem of the valve and adapted to project into the carbureted-air stream of an internal combustion engine.

5. An apparatus of the character described comprising a conduit for a flow stream, a container for lubricating oil provided with an outlet adapted to communicate with the conduit, a valve to control said outlet, a means controlled by the speed of the flow stream to open the valve to a degree that varies directly as the speed of the flow stream, and a vent from said outlet to the atmosphere for preventing the pressure of the flow stream from influencing the rate of flow of the lubricating oil from said container through the outlet.

6. An apparatus of the character described comprising a chamber vented to the atmosphere and provided with an outlet, flow control means in said outlet, and means controlled by the speed of the carbureted-air stream of an internal combustion engine for actuating said flow control means.

JOHN C. HANDY.